(12) United States Patent
Lee et al.

(10) Patent No.: US 7,472,459 B2
(45) Date of Patent: Jan. 6, 2009

(54) HINGE STRUCTURE FOR FLAT VISUAL DISPLAY DEVICE

(75) Inventors: Gang Hoon Lee, Gumi-si (KR); Hong Ki Kim, Deagu-si (KR)

(73) Assignee: LG Electronics Inc., Seoul (KR)

( * ) Notice: Subject to any disclaimer, the term of this patent is extended or adjusted under 35 U.S.C. 154(b) by 235 days.

(21) Appl. No.: 10/500,127

(22) PCT Filed: Jul. 27, 2002

(86) PCT No.: PCT/KR02/01430

§ 371 (c)(1),
(2), (4) Date: Jun. 25, 2004

(87) PCT Pub. No.: WO03/056410

PCT Pub. Date: Jul. 10, 2003

(65) Prior Publication Data

US 2005/0102796 A1 May 19, 2005

(30) Foreign Application Priority Data

Dec. 27, 2001 (KR) .............................. 2001-85857

(51) Int. Cl.
*E05C 17/64* (2006.01)
*E05F 1/08* (2006.01)
(52) U.S. Cl. .............................. 16/342; 16/297; 16/337
(58) Field of Classification Search .................... 16/297, 16/342, 337, 338, 341, 252; 411/544
See application file for complete search history.

(56) References Cited

U.S. PATENT DOCUMENTS

| | | | | |
|---|---|---|---|---|
| 714,959 A | * | 12/1902 | Sloan ........................... | 16/342 |
| 4,437,784 A | * | 3/1984 | Peterson .................. | 403/408.1 |
| 4,490,884 A | * | 1/1985 | Vickers ....................... | 16/338 |
| 4,617,699 A | * | 10/1986 | Nakamura .................... | 16/262 |
| 4,948,317 A | * | 8/1990 | Marinaro ..................... | 411/535 |
| 5,031,275 A | * | 7/1991 | Chiang ........................ | 16/263 |
| 5,108,243 A | * | 4/1992 | Antonucci .................. | 411/547 |
| 5,112,178 A | * | 5/1992 | Overhues et al. ............ | 411/544 |
| 5,406,678 A | | 4/1995 | Rude et al. ................... | 16/342 |
| 5,598,607 A | | 2/1997 | Katagiri ...................... | 16/337 |
| 5,632,066 A | * | 5/1997 | Huong ........................ | 16/338 |
| 5,682,645 A | | 11/1997 | Watabe et al. ................. | 16/338 |

(Continued)

FOREIGN PATENT DOCUMENTS

EP 80979 A * 6/1983

*Primary Examiner*—Victor Batson
*Assistant Examiner*—David C Reese
(74) *Attorney, Agent, or Firm*—Ked & Associates, LLP

(57) ABSTRACT

A hinge structure for a flat visual display device comprising: a pivotal plate connected to the flat visual display device; a fixing plate connected to a supporting portion for supporting the flat visual display device; a rotational shaft inserted to vertical planes of the pivotal plate and the fixing plate, for rotation of the flat visual display device in one degree of freedom; a frictional member which is formed on an outer periphery of the rotational shaft for enclosing the rotational shaft, and whose both ends have a frictional member tightening plane of a planar shape on which a second inserting hole is formed; and a tightening member inserted to the second inserting hole, for tightening the frictional member tightening plane, thereby tightening the rotational shaft by means of the frictional member, and generating strong breaking force accordingly.

16 Claims, 4 Drawing Sheets

U.S. PATENT DOCUMENTS

| | | | |
|---|---|---|---|
| 6,018,847 A * | 2/2000 | Lu | 16/337 |
| 6,085,388 A * | 7/2000 | Kaneko | 16/338 |
| 6,145,797 A * | 11/2000 | Uehara | 248/291.1 |
| 6,584,646 B2 * | 7/2003 | Fujita | 16/342 |
| 6,601,810 B2 * | 8/2003 | Lee | 248/278.1 |

* cited by examiner

HINGE STRUCTURE FOR FLAT VISUAL DISPLAY DEVICE

TECHNICAL FIELD

The present invention relates to a hinge structure, and more particularly, to a hinge structure for a flat visual display device, wherein the hinge is used as a fabrication between two members on which the hinge is applied, whereby the two members operate smoothly and braking force due to proper frictional force is provided.

BACKGROUND ART

Common household articles have adopted lots of conventional hinge structures where in order for their movement of one degree of freedom to up and down or right and left, rotational member and fixing member are connected on the same shaft, so that relative rotational motion is generated between the fixing member and the rotational member.

More detailed explanation can be made with following examples for product operation on which such hinge structure is applied, which includes predetermined operation such as open or shut of product cap, open or shut of upper side in notebook computer, up and down adjustment of a flat visual display device, etc. Particularly, the present invention is directed to a hinge structure for a flat visual display device which can be more appropriately applied to a flat visual display device.

Generally, such hinge structure has a frictional member on which predetermined frictional force is applied, and an elastic member for supporting a load of a rotational member.

Examples of the conventionally proposed hinge structures include those disclosed in Korean Laid-Open Utility Model Registration Application No. 20200110000941 and 20200110000942. In particular, Korean Laid-Open Patent Application No. 1020000028262 discloses an example of hinge structure proposed for application to a LCD monitor.

But, the conventional hinge structures such as those proposed above have a problem that a rotational shaft inserted to a central shaft of the hinge should be cut by a predetermined flat panel.

Also, the conventional hinge structure was problematic in that in order for adjustment of breaking force of the hinge, the rotational shaft inserted to the fixing member and the rotational member should be tightened separately in its both ends by a plurality of nuts and washers, namely, external force should be applied via complicated route.

The present invention has been proposed to solve the above problems and, therefore, it is an object of the present invention to provide a hinge structure for a flat visual display device which adopts a simple circular shaft as a rotational shaft, thereby focusing on convenience in adjustment.

It is another object of the present invention to provide a hinge structure for a flat visual display device capable of adjusting easily frictional force exerted on the structure and breaking force thereto depending on a weight of the flat visual display device.

It is further another object of the present invention to provide a hinge structure for a flat visual display device capable of concentrating a portion on which frictional force is exerted into one single portion, so that force exerted on both ends of the rotational shaft may be distributed uniformly, whereby a user can adjust a position of a flat visual display device in a stable manner.

DISCLOSURE OF THE INVENTION

A hinge structure for a flat visual display device to achieve the above objects comprising: a pivotal plate connected to the flat visual display device; a fixing plate connected to a supporting portion for supporting the flat visual display device; a rotational shaft inserted to vertical planes of the pivotal plate and the fixing plate, for rotation of the flat visual display device in one degree of freedom; a frictional member which is formed on an outer periphery of the rotational shaft for enclosing the rotational shaft, and whose both ends have a frictional member tightening plane of a planar shape on which an inserting hole is formed; and a tightening member inserted to the inserting hole, for tightening the frictional member tightening plane, thereby tightening the rotational shaft by means of the frictional member, generating strong breaking force accordingly.

The present invention having the structure as disclosed above is capable of distributing frictional force uniformly over the more broad area upon rotation of the rotational shaft, thereby adjusting operation of the flat visual display device in a swift manner.

Also, the present invention is capable of controlling breaking force necessary for adjustment of the flat visual display device.

BRIEF DESCRIPTION OF THE DRAWINGS

The above objects, features and advantages of the present invention will become more apparent from the following detailed description when taken in conjunction with the accompanying drawings, in which.

BEST MODE FOR CARRYING OUT THE INVENTION

Figure 1:
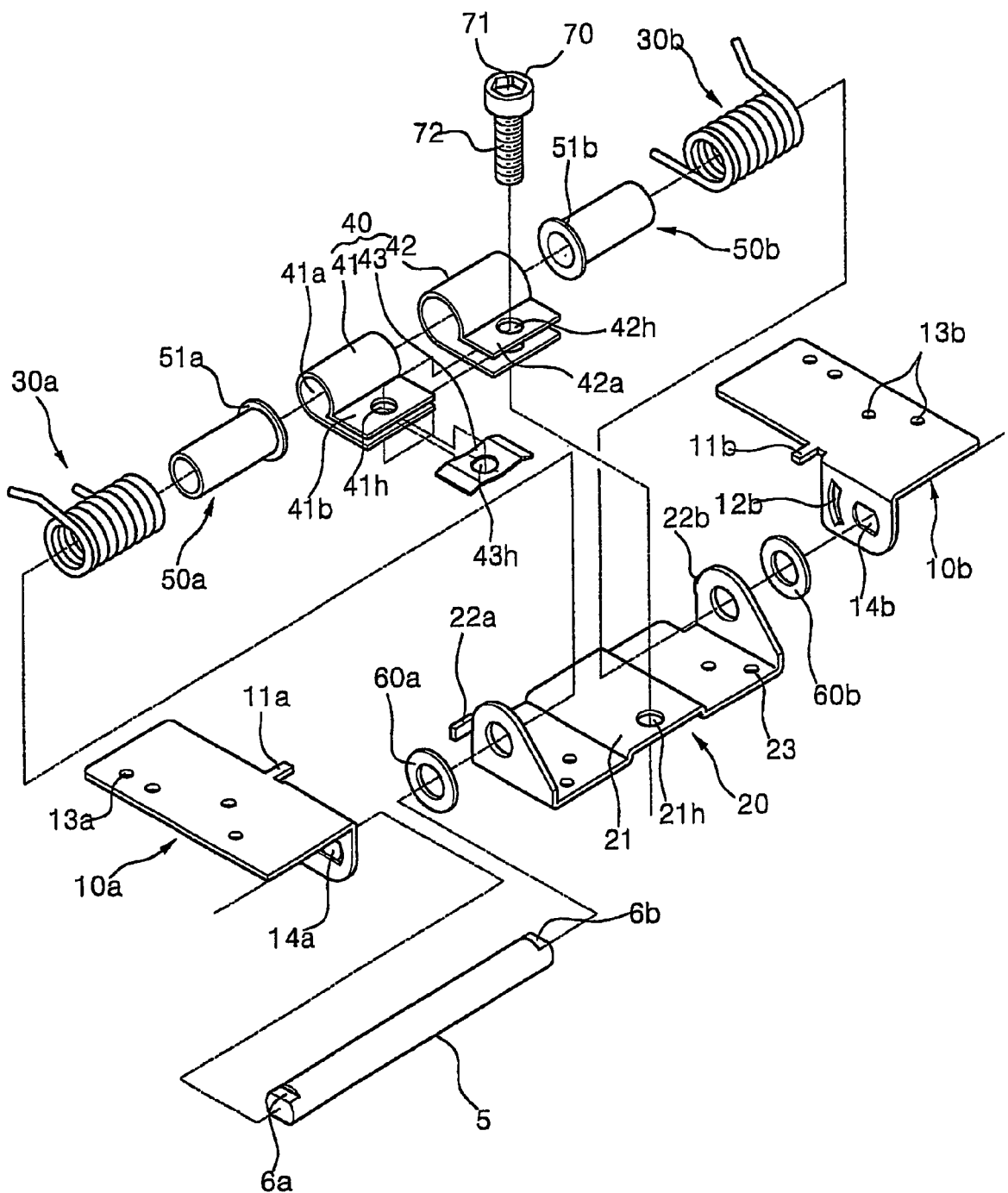
FIG. 1 is an exploded perspective view of a hinge structure for a flat visual display device according to the present invention.

A preferred embodiment of a hinge structure for a flat visual display device according to the present invention will now be described with reference to the accompanying drawings. In the following description, same drawing reference numerals are used for the same elements even in different drawings. The matters defined in the description such as a detailed construction and elements of a hinge structure are nothing but the ones provided to assist in a comprehensive understanding of the invention. Thus, it is apparent that the present invention can be carried out, not limited to those defined matters. Also, well-known functions or constructions are not described in detail since they would obscure the invention in unnecessary detail.

FIG. 1 is an exploded perspective view of a hinge structure for a flat visual display device according to the present invention. Referring to FIG. 1, a hinge structure according to the present invention can be explained in the following: in which a hinge structure is comprised of pivotal plates 10a and 10b connected on a rear side of a flat visual display device; a fixing plate 20 fixed relatively with respect to the pivotal plates 10a and 10b and connected to a predetermined supporting member; a rotation shaft 5 inserted to perpendicular planes of the fixing plate 20 and the pivotal plates 10a and 10b; an elastic members 30a and 30b whose both ends are hooked at the fixing plate 20 and pivotal plates 10a and 10b so that up and down movements of the fixing plate and the pivotal plates are supported in a direction such that a weight of the flat visual display device is supported; a break controlling part 40 formed on an outer periphery of the rotational shaft 5, for applying breaking force on the rotational shaft 5; cylindrical spacers 50a and 50b mounted on an inner plane of the elastic member 30, for preventing direct contact of the elastic member 30 with the rotational shaft 5, thereby preventing noise generation; washers 60a and 60b mounted on a contact plane between the pivotal plates 10a and 10b and the fixing plate 20, for distributing frictional force uniformly and preventing noise generation; and a tightening member 70 inserted to the break controlling part 40, for tightening the break controlling part 40, thereby adjusting frictional force exerted on the rotational shaft 5 or corresponding breaking force thereto.

In the meantime, the pivotal plates 10a and 10b, the elastic member 30a and 30b, the cylindrical spacers 50a and 50b, washers 60a and 60b are formed and operated in pairs on both sides in order to achieve an object of uniform distribution of breaking force.

Hereinafter, for the elements and their sub-elements formed in pairs such as the pivotal plates 10a and 10b as mentioned above, reference numerals are marked only by numerical portion with character portion excluded, for the structure and operation of one element are the same as that of the other element.

More detailed explanation will be made for each part of the present invention in the following. The pivotal plates 10 are formed on both sides of the fixing plate 20, respectively, and comprised of a horizontal plane on which a plurality of pivotal plate fastening holes 13a and 13b are formed for being connected to a predetermined supporting member, and a vertical plane corresponding to the horizontal plane.

The vertical plane of the pivotal plate 10 is comprised of: a guiding portion 12 to which a guiding protuberance 22 of the fixing plate 20 is inserted, for restricting a pivoting angle of the fixing plate 20; an elastic member hooking protuberance 11 at which one end of the elastic member 30 is hooked, for generating a predetermined elastic force at the elastic member 30; and a shaft fixing portion of non circular shape 14 into which both ends of the rotational shaft 5 are inserted, for concurrent operation of the rotational shaft 5 and the pivotal plates 10a and 10b.

Preferably, the shaft fixing portion 14 are of the same shape as fixing portions 6a and 6b formed as an end terminal of the rotational shaft 5, on which grooves are formed on their both opposing sides.

Specifically, the fixing plate 20 is comprised of an elevated plane 21 on which a fourth inserting hole 21h for receiving and fixing a bottom of the tightening member 70; a horizontal plane, formed in both sides adjacent to the elevated plane 21, on which a fixing plate fastening hole 23 is formed so that the fixing plate 20 may be connected to a flat visual display device; and a vertical plane extended vertically from the horizontal plane. In addition, the vertical plane is further comprised of a guiding protuberance 22 inserted to the pivotal guiding portion 12, for restricting a pivoting angle of the fixing plate 20.

More specifically, one end of the elastic member 30 is hooked at the elastic member hooking protuberance 11 and the other end is hooked on the horizontal plane of the fixing plate 20, so that predetermined restoring force corresponding to relative movements between the fixing plate 20 and the pivotal plates 10a and 10b, is always applied. Restoring force of the elastic member 30 is directed such that a flat visual display device is raised up, so that the restoring force may hold out a weight of a flat visual display device.

For the elastic member 30, a torsion spring in which metal members are stacked in a wired manner, is preferably used.

Also, the break controlling part 40 is comprised of a frictional member 41 in direct contact with the rotational shaft 5, for forming a frictional plane; a frictional housing 42 formed on a outer periphery of the frictional member 41, for adjusting frictional force exerted on the rotational shaft 5; and a plate shaped spacer 43 inserted to a planar portion of the frictional member 41, for properly adjusting frictional force.

Specifically, the frictional member 41 is comprised of a shaft frictional plane 41a formed as a sleeve at an outer periphery of the rotational shaft 5, for being in direct contact with the rotational shaft 5 for friction to be generated; a frictional member tightening planes 41b made by pairs, for being tightened by the tightening member 70. In addition, the frictional member tightening plane 41b is comprised of a pair of second inserting holes 41h arranged vertically for receiving the tightening member 70.

More specifically, the frictional housing 42 is a sleeve of the same shape as the frictional member 41 and protects the outer periphery of the frictional member 41, thereby preventing the frictional member 41 from being destroyed upon tightening operation of the tightening member 70. Preferably, metallic material guaranteeing a predetermined strength is used for the frictional housing 42, and the frictional housing 42 has a planar shaped housing plane 42a in its both end portions, on which a first inserting hole 42h for receiving the tightening member 70 and tightening the frictional housing 42, is formed.

More specifically, the plate shaped spacer 43 has a plurality of planes bent up and down on it, so that transformation of the spacer may be generated to a predetermined extent when tightened by the tightening member 70, thereby preventing excessive transformation of the frictional member 41, getting a user to adjust and know the extent of breaking force in a simple manner.

Also, the cylindrical spacer 50 receives the rotational shaft 5 through its inside, on the one end of which a rug 51 that touches the break controlling part 40 is formed, the other end of which touches the vertical plane of the fixing plate 20.

Furthermore, the elastic member 30 is mounted on an outer periphery of the cylindrical spacer 50 for preventing direct contact of the elastic member 30 with the rotational shaft 5, so that the hinge structure of the present invention operates more smoothly.

In addition, the washer 60 receives the rotational shaft 5 through a punctured portion on its center, both sides of which are in contact with the fixing plate 20 and the pivotal plate 10, respectively, thereby reducing noise and abrasion of the contact plane that may be generated during operation of the hinge structure.

In the meantime, engineering plastic is preferably used for the cylindrical spacer 50 and the washer 60 so as to reduce friction of a metallic member touched and to prevent noise generation. Also, engineering plastic is preferably used for the frictional member 41 for smooth movement of the shaft frictional plane 41a.

Furthermore, the tightening member 70 is inserted to the first inserting hole 42h, the second inserting hole 41h, the third inserting hole 43h, and the fourth inserting hole 21h in sequence, so that the break controlling part 40 may be tightened. Here, the tightening member 70 has a wrench inserting groove 71 on its upper end, for receiving tightening means such as a wrench and has an uneven portion 72 on its bottom, for being fixed after the tightening member is tightened. In the meantime, the uneven portion 72 is fixed by an uneven portion formed on an inner periphery of the fourth inserting hole 21h.

Preferably, the tightening member 70 is a bolt and female screw is formed on the inner periphery of the fourth inserting hole 21h. The hinge structure according to the present invention will now be described herein below with reference to the foregoing constitution and formation. The rotational shaft 5 is inserted to the vertical plane of the pivotal plate 10 and to the vertical plane of the fixing plate 20, and both ends of the rotational shaft 5 are fixed in the pivotal plate 10.

Also, the break controlling part 40 is mounted proximately on a center of the rotational shaft, for applying breaking force and is connected to the fixing plate 20 by means of the tightening member 70. Due to such structure, when the pivotal plate 10 is pivoted, the rotational shaft 5 is pivoted simultaneously and frictional force as a predetermined breaking force is generated in the contact plane between an outer periphery the rotational shaft 5 and the shaft frictional plane 41a while the pivotal plate 10 is being rotated.

In the meantime, the elastic member 30 is given continuous restoring force corresponding to a weight of a flat visual display device, so that external force corresponding to a weight of a flat visual display device, necessary for a user to raise up a flat visual display device to an upper side, is reduced to a predetermined amount, which contributes to user convenience.

Figure 2:
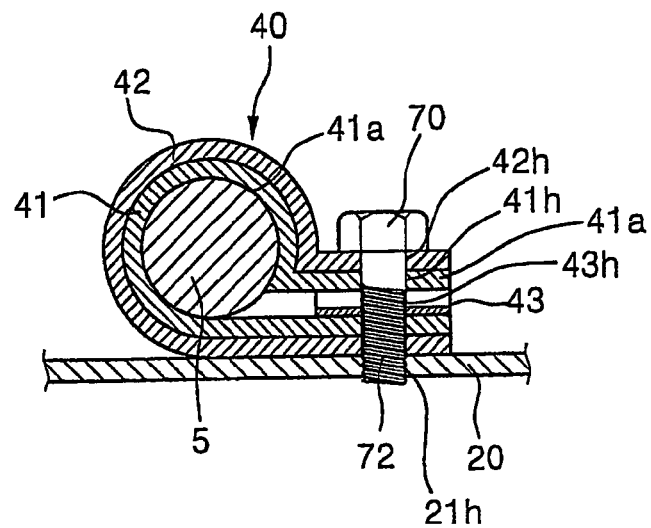
FIG. 2 is a cross-sectional view illustrating a break controlling part in a hinge structure of the present invention.

FIG. 2 is a cross-sectional view illustrating operation of the break controlling part in the hinge structure of the present invention. Referring to FIG. 2, the break controlling part is comprised of the frictional member 41 for enclosing the rotational shaft 5 and applying frictional force on the rotational shaft 5; the frictional housing 42 for enclosing an outer periphery of the frictional member 41 again and for reinforcing strength of the frictional member 41, thereby preventing destruction of the frictional member 41; and the plate shaped spacer 43 inserted between the frictional member tightening planes 41b formed at both ends of the frictional member 41 for a predetermined gap to be maintained between the frictional member tightening planes, whereby destruction of the frictional member 41 is prevented during tightening operation by the tightening member 70.

Also, the break controlling part 40 is further comprised of the fixing plate 20 formed in its bottom side, on which the fourth inserting hole 21h is formed; the tightening member 70 for tightening the break controlling part 40. On an inner periphery of the fourth inserting hole 21h, an uneven portion corresponding to the uneven portion 72 of the tightening member 70 is formed for tightening the tightening member 70. In addition, the tightening member 70 passes through the first inserting hole 42h, the second inserting hole 41h, the third inserting hole 43h, and the fourth inserting hole 21h in succession, thereby tightening the frictional member 41, the frictional housing 42, and the plate shaped spacer 43.

In the meantime, the plate shaped spacer 43 give a predetermined gap to the frictional member tightening plane 41b formed at the both ends of the frictional member 41, so that strong pressure exerted on the frictional member 41 of soft material may be dispersed, whereby destruction of the frictional member 41 is prevented. In addition, as the plate shaped spacer 43 has a predetermined elasticity, restoring force is generated differently depending on strength with which the tightening member 70 is inserted. Accordingly, a user is able to know the tightening strength of the frictional member 41 conveniently.

Operation of the break controlling part 40 will now be described in the following. When the tightening member 70 is inserted more deeply, namely, tightening is made by strong force, strong force is exerted on the frictional member 41, the frictional housing 42, and the plate shaped spacer 43, by which the gap between the frictional member tightening planes 41b is narrowed. Accordingly, breaking force exerted on the rotational shaft 5 by the shaft frictional plane 41a, gets stronger even more.

In the meantime, though the force exerted on the frictional member tightening plane 41b is small, the shaft frictional plane 41a is formed along all over the outer periphery of the rotational shaft 5, so that frictional force can be adjusted properly. More specifically, even though frictional force exerted on the frictional member 41 is small, a width of the frictional member 41 may be lengthened so as to generate frictional force on wide area of the width, compensating for insufficient frictional force. Therefore, restoring force necessary for supporting a weight of a flat visual display device, is secured.

Figure 3:
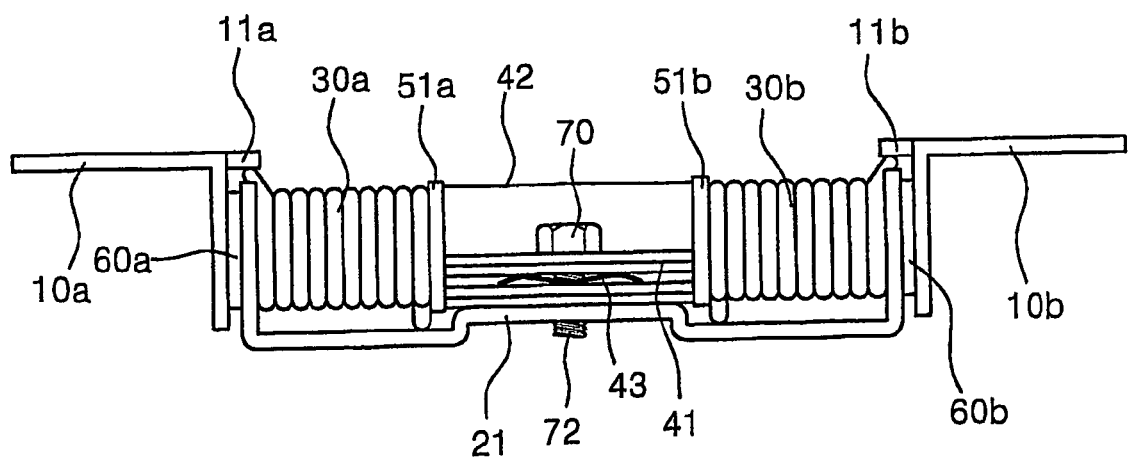
FIG. 3 is a front view for a hinge structure of a flat visual display device according to the present invention.

More definite understanding of operation and formation of the break controlling part as described above will be achieved with reference to a front view for the break controlling part as shown in FIG. 3.

FIG. 3 is a front view for the hinge structure of a flat visual display device according to the present invention. Referring to FIG. 3, the tightening member 70 moves up and down, and breaking force is applied accordingly, then breaking force is transferred to the rotational shaft 5 properly (as shown in FIG. 2). In addition, in case that the tightening member 70 is raised up and breaking force is reduced, force is exerted in a direction such that frictional force is reduced due to restoring force of the plate shaped spacer 43, whereby breaking force by the frictional member 41 is reduced more swiftly.

In the meantime, the one end of the elastic member 30 is hooked at the elastic member hooking protuberance 11 of the pivotal plate 10 and the other end is hooked on the horizontal plane of the fixing plate 20, so that upon generation of predetermined transformation in the elastic member 30, restoring force thereto is generated in the elastic member 30, whereby the pivotal plate 10 is restored to its original position.

Figure 4:
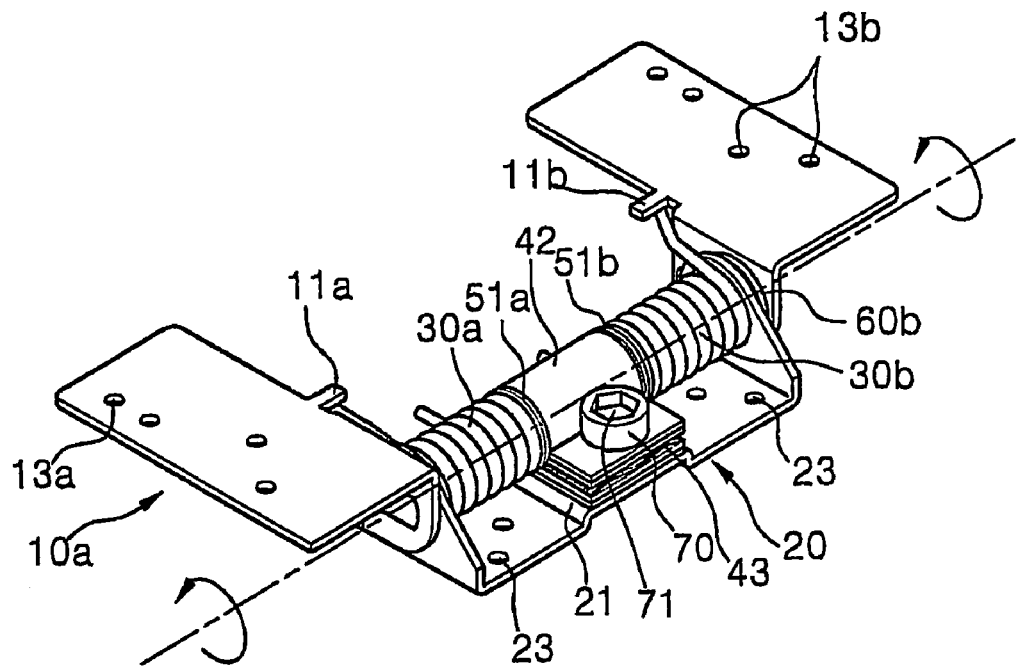
FIG. 4 is a perspective view for a hinge structure of a flat visual display device according to the present invention.

FIG. 4 is a perspective view for the hinge structure of a flat visual display device according to the present invention. Referring to FIG. 4, when the pivotal plate 10 is rotated counterclockwise with respect to the rotational shaft 5, i.e., to a direction as shown in FIG. 4 by a flat visual display device connected to a rear side of the pivotal plate 10, torsion is generated at the elastic member 30 through the one end of the elastic member 30, more specifically, the one end that touches the pivotal plate 10.

Torsion exerted on the elastic member 30 generates restoring force in a direction opposite to the exerted torsion, restoring the pivotal plate 10 to its original position. Here, the direction of restoring force is reverse direction of an arrow shown in FIG. 4. Namely, the elastic member 30 exerts elastic force in a circumferential direction upon rotation of the rotational shaft 5. Resultantly, restoring force of the elastic member 30 is exerted in a direction of holding out a weight of a flat visual display device, supporting the same.

Also, after the both ends of the rotational shaft 5 is inserted to the pivotal plate 10, hit the ends so that the ends may be widened on their end periphery, thereby preventing the pivotal plate 10 from detaching from the rotational shaft 5.

In the meantime, in order for space for the elastic member to be secured on both lateral portion of the rotational shaft 5, an upper plane of the fixing plate 20 on which the break controlling part 40 is mounted, is formed as the elevated plane 21 elevated to a predetermined extent and the other horizontal planes of the fixing plate 20 are positioned low compared with the elevated plane 21. Accordingly, a space for the elastic member 30 can be secured.

Figure 5:
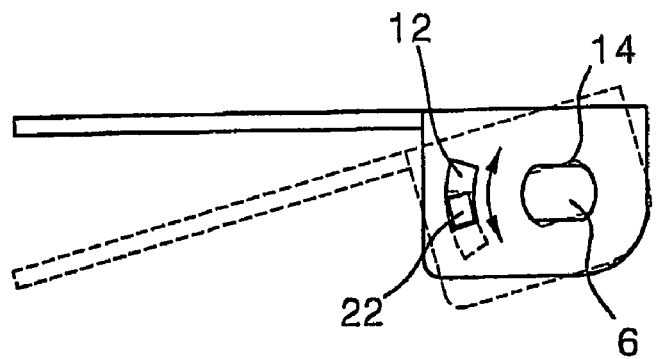
FIG. 5 is a drawing illustrating rotational limitation of a pivotal plate in a hinge structure for a flat visual display device according to the present invention.

FIG. 5 is a drawing illustrating rotational limitation of the pivotal plate in the hinge structure for a flat visual display device according to the present invention. Referring to FIG. 5, the guiding protuberance 22 bent and extended at the vertical plane of the fixing plate 20, and the pivotal guiding portion 12 formed on the vertical plane of the pivotal plate 10 with a predetermined curvature for receiving the guiding protuberance 22, are shown in the picture.

When a flat visual display device connected to the rotational plate 10 moves with one degree of freedom, the vertical plane of the pivotal plate 10 is also rotated simultaneously, and the pivotal guiding portion 12 is rotated accordingly. The guiding protuberance 22, however, is not rotated for it forms one body together with the fixing plate 20.

Referring to such constitution, as relative position of the guiding protuberance 22 can be changed within an inside of the pivotal guiding portion 12, the position of the guiding protuberance 22 is restricted to a range between the upper limit and bottom limit of the pivotal guiding portion 12.

Also, the guiding protuberance 22 is extended from the fixing plate 20, being formed as one body together with the fixing plate 20, whereby the pivotal plate 10 can be rotated within a predetermined pivoting angle. Such restriction of pivoting angle range for the pivoting plate 10, is for preventing a flat visual display device connected to the pivoting plate 10 forming one body together with it, from moving beyond the upper and bottom limits of allowed pivoting range, and from striking against other parts, and being destroyed accordingly.

Figure 6:
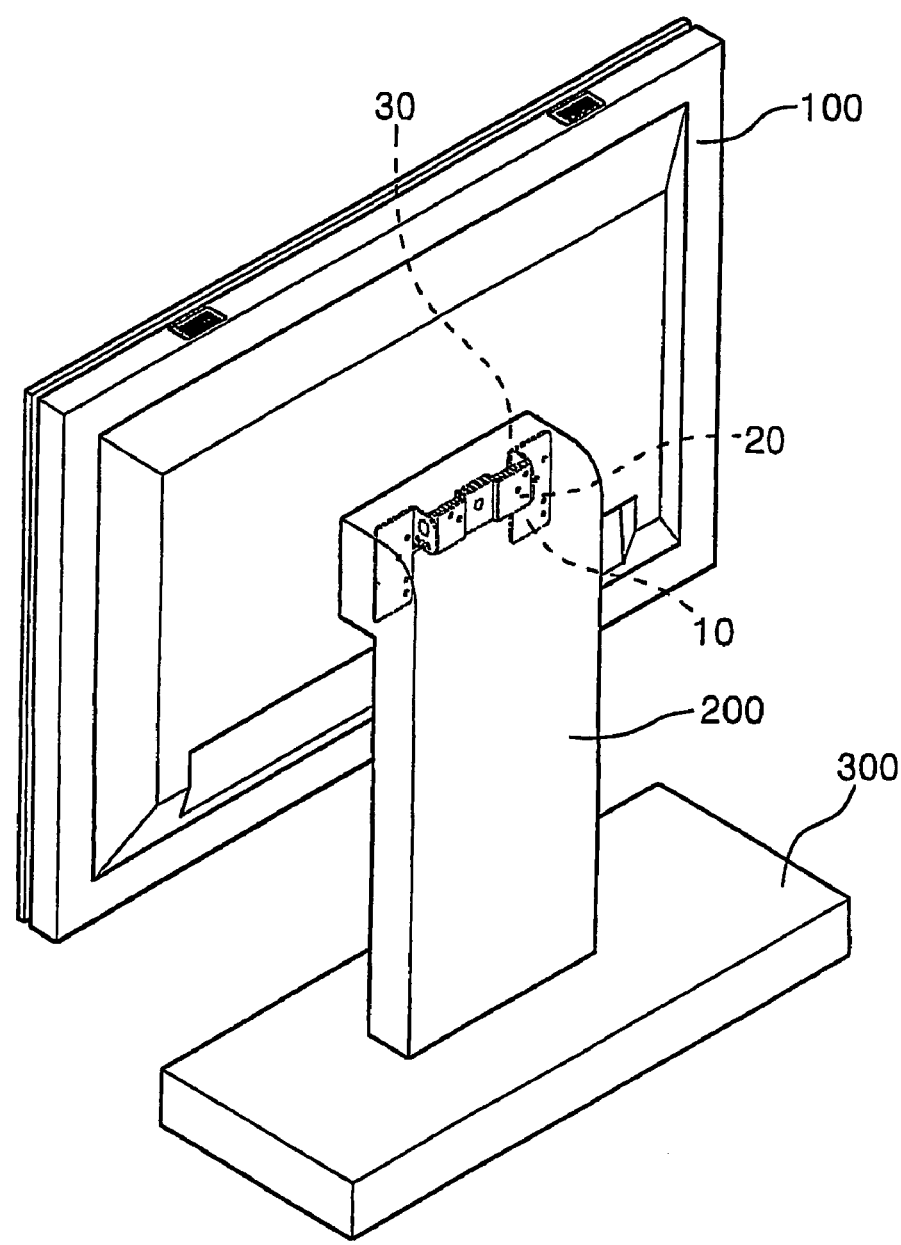
FIG. 6 is a drawing connected status where a hinge structure according to the present invention is connected to a flat visual display device.

FIG. 6 is a drawing connected status where a hinge structure according to the present invention is connected to a flat visual display device. Referring to FIG. 6, a flat visual display device 100, a supporting portion 200 for straightening a flat visual display device, a base portion 300 formed in a bottom of the supporting portion 200 are shown in the picture.

The hinge structure of the present invention is mounted between the constituents described above, the fixing plate 20 is connected to the supporting portion 200 in its rear side, the pivotal plate 10 is connected to the flat visual display device in its front side. With such constitution, a flat visual display device can be rotated up and down more freely.

In the meantime, operation of the hinge structure of the present invention is explained in the following, in which: the break controlling part 40 is connected to the fixing plate 20, as one body together with the fixing plate and is formed around the outer periphery of the rotational shaft 5 (as shown in FIG. 1) for generating frictional force against the rotational shaft 5; accordingly, breaking force can be adjusted properly by a user.

Also, the elastic member 30 exerts restoring force in a direction of raising up the pivoting plate 10 so that a flat visual display device may not be hung down by the weight itself.

Though the invention has been shown and described with reference to a certain preferred embodiment thereof, it will be understood by those skilled in the art that various changes in form and details may be made therein without departing from the spirit and scope of the invention as defined by the appended claims.

INDUSTRIAL APPLICABILITY

The hinge structure of a flat visual display device according to the present invention, has the break controlling part mounted on a central portion of the rotational shaft, for adjusting breaking force, so that breaking force of same strength is generated in both lateral portions of the rotational shaft. Therefore, a user operates a flat visual display device properly and swiftly.

Also, according to the hinge structure of the present invention, breaking force controlling can be achieved merely by adjusting tightening strength of the tightening member, so that a user may adjust and use breaking force of the hinge structure conveniently.

Furthermore, the hinge structure of the present invention simplifies fastening structure, thereby reducing manufacturing cost thereof.

The invention claimed is:

1. A hinge structure for a flat visual display device, comprising:
   a plurality of pivotal plates connected to the flat visual display device, for rotation of the flat visual display device;
   a fixing plate connected to a supporting portion that supports the flat visual display device;
   a rotational shaft inserted into vertical planes of the plurality of pivotal plates and the fixing plate, for rotation of the plurality of pivotal plates in one degree of freedom;
   a frictional member mounted around an outer periphery of the rotational shaft, so as to enclose the rotational shaft, both ends of which have a frictional member tightening plane of a planar shape in which an inserting hole is formed;
   a tightening member inserted into the inserting hole, so as to tighten the frictional member tightening plane, thereby tightening the rotational shaft by means of the frictional member, and generating strong breaking force accordingly; and
   a plate shaped spacer inserted between the frictional member tightening planes, so as to provide a predetermined gap between the lightening planes, wherein one of the plurality of pivotal plates is provided on one side of the frictional member and another of the plurality of pivotal plates is provided on the other side of the frictional member.

2. The hinge structure for a flat visual display device as set forth in claim 1, wherein at least one frictional member is formed on a center of the rotational shaft.

3. The hinge structure for a flat visual display device as set forth in claim 1, wherein a washer is inserted between contact planes of the fixing plate and each of the plurality of pivotal plates to provide a swift pivoting operation of the fixing plate and the pivoting plates.

4. The hinge structure for a flat visual display device as set forth in claim 1, wherein a frictional housing is formed around an outer periphery of the frictional member, so as to prevent destruction of the frictional member in spite of strong force exerted by the lightening member.

5. The hinge structure for a flat visual display device as set forth in claim 1, wherein a fixing portion of non circular shape is formed on an outer periphery of both ends of the rotational shaft, and a shaft fixing portion of each of the plurality of pivotal plates is formed in the same shape as the fixing portion, so as to receive the fixing portion, whereby the plurality of pivotal plates and the rotational shaft are rotated together simultaneously.

6. The hinge structure for a flat visual display device as set forth in claim 1, further comprising:
   guiding protuberances extended to an outside of vertical planes of the fixing plate;
   a pivotal guiding portion formed on a vertical plane of each of the plurality of pivotal plates in an arc shape, so as to receive the guiding protuberances, respectively, and restrict a pivoting angle of the plurality of pivotal plates accordingly.

7. The hinge structure for a flat visual display device as set forth in claim 1, wherein a washer of plastic material is inserted on a contact plane between the fixing plate and each of the plurality of pivotal plates, so as to prevent abrasion and provide swift operation.

8. The hinge structure for a flat visual display device as set forth in claim 1, wherein the frictional member is made of engineering plastic.

9. A hinge structure for a flat visual display device, comprising:
   a plurality of pivotal plates connected to the flat visual display device, for rotation of the flat visual display device;
   a fixing plate connected to a supporting portion that supports the flat visual display device;
   a rotational shaft inserted into vertical planes of the plurality of pivotal plates and the fixing plate, for rotation of the plurality of pivotal plates in one degree of freedom;
   a frictional member mounted around an outer periphery of the rotational shaft, so as to enclose the rotational shaft, both ends of which have a frictional member tightening plane of a planar shape in which an inserting hole is formed;
   a tightening member inserted into the inserting hole, so as to tighten the frictional member tightening plane, thereby tightening the rotational shaft by means of the frictional member, and generating strong breaking force accordingly;
   elastic members, both ends of each of the elastic members being hooked to the fixing plate and one of the plurality of pivoting plates, respectively, and mounted around the rotational shaft, so as to generate elastic force in a circumferential direction upon rotation of the rotational shaft;
   guiding protuberances extended to an outside of vertical planes of the fixing plate;
   a pivotal guiding portion formed on a vertical plane of each of the plurality of pivotal plates in an arc shape, so as to receive the guiding protuberances and restrict a pivoting angle of the plurality of pivotal plates accordingly;
   a plurality of cylindrical spacers mounted around a contact plane between the elastic members and the rotational shaft, respectively, so as to prevent direct contact of the elastic members with the rotational shaft and reduce noise and abrasion accordingly; and
   a plate spacer inserted between the frictional member tightening planes, so as to provide a predetermined gap between the tightening planes, wherein one of the plurality of cylindrical spacers is provided on one side of the frictional member and another of the plurality of cylindrical spacers is provided on the other side of the frictional member.

10. The hinge structure for a flat visual display device as set forth in claim 9, wherein the elastic member consists of a torsion spring comprising a predetermined iron wire stacked in a coil shape.

11. The hinge structure for a flat visual display device as set forth in claim 9, wherein the one end of each of the elastic members is hooked on a horizontal plane of the fixing plate and the other end of each of the elastic members is hooked on an elastic member hooking protuberance extended to an inside from an horizontal plane of a respective one of the plurality of pivotal plates.

12. The hinge structure for a flat visual display device as set fort in claim 9, wherein the frictional member is made of engineering plastic.

13. A hinge structure for a flat visual display device, comprising:
   a plurality of pivotal plates connected to the flat visual display device, for rotation of the flat visual display device;
   a fixing plate connected to a supporting portion that supports the flat visual display device;
   a rotational shaft inserted into vertical planes of the plurality of pivotal plates and the fixing plate, for rotation of the plurality of pivotal plates in one degree of freedom;
   a frictional member mounted around an outer periphery of the rotational shaft, so as to enclose the rotational shaft, and both ends of which have a frictional member tightening plane of a planar shape in which an inserting hole is formed;
   a tightening member inserted into the inserting hole, so as to tighten the frictional member tightening plane, thereby tightening the rotational shaft by means of the frictional member, and generating strong breaking force accordingly;
   elastic members both ends of each of the elastic members being hooked at the fixing plate and one of the plurality of pivoting plates, respectively, and mounted around the rotational shaft, so as to generate elastic force in a circumferential direction upon rotation of the rotational shaft;
   a plurality of cylindrical spacers mounted around a contact plane between the elastic members and the rotational shaft, respectively, so as to prevent direct contact of the elastic members with the rotational shaft and reduce noise and abrasion accordingly; and
   a plate shaped spacer inserted between the tightening planes, so as to provide a predetermined gap between the tightening planes, wherein one of the plurality of cylindrical spacers is provided on one side of the frictional member and another of the plurality of cylindrical spacers is provided on the other side of the frictional member.

14. The hinge structure for a flat visual display device as set forth in claim 13, wherein the elastic member consists of a torsion spring comprising a predetermined iron wire stacked in a coil shape.

15. The hinge structure for a flat visual display device as set forth in claim 13, wherein the one end of each of the elastic members is hooked on a horizontal plane of the fixing plate and other end of each of the elastic members is hooked on an elastic member hooking protuberance extended to an inside from an horizontal plane of a respective one of the plurality of pivotal plates.

16. The hinge structure for a flat visual display device as set forth in claim 13, wherein the frictional member is made of engineering plastic.

* * * * *